United States Patent [19]

Numata

[11] 4,274,722
[45] Jun. 23, 1981

[54] AUTOMATIC FLASH LIGHT CONTROL DEVICE FOR CAMERA

[75] Inventor: Saburo Numata, Urawa, Japan

[73] Assignee: Fuji Photo Optical Co., Ltd., Omiya, Japan

[21] Appl. No.: 936,691

[22] Filed: Aug. 25, 1978

[30] Foreign Application Priority Data

Aug. 31, 1977 [JP] Japan .................... 52-104638

[51] Int. Cl.³ .............................. G03B 15/05
[52] U.S. Cl. ..................... 354/33; 354/145
[58] Field of Search .......... 354/33, 35, 60 F, 126, 354/127, 149, 289, 34, 46, 139, 145

[56] References Cited

U.S. PATENT DOCUMENTS

| | | | |
|---|---|---|---|
| 3,683,765 | 8/1972 | Iura | 354/46 |
| 3,710,701 | 1/1973 | Takishima et al. | 354/149 X |
| 3,738,240 | 6/1973 | Mitani et al. | 354/33 |
| 4,005,444 | 1/1977 | Uchiyama et al. | 354/149 X |
| 4,023,188 | 5/1977 | Ueda et al. | 354/33 |
| 4,047,194 | 9/1977 | Nakamura et al. | 354/149 |
| 4,078,242 | 3/1978 | Uchiyama et al. | 354/33 X |
| 4,095,242 | 6/1978 | Tsunekawa et al. | 354/139 X |
| 4,127,325 | 11/1978 | Ohtaki et al. | 354/46 X |

Primary Examiner—L. T. Hix
Assistant Examiner—William B. Perkey

[57] ABSTRACT

A single lens reflex camera having an interchangeable lens and provided with an exposure control device of the aperture size priority type is provided with a flash light control device in which the amount of light emitted by a flash light tube is controlled by a control circuit according to the film sensitivity of the film in the camera and the selected diaphragm aperture size. The selected diaphragm aperture size is input into the control circuit in terms of first information representing the displacement of the selected diaphragm aperture size from the full aperture size of the lens and second information representing the full aperture size of the lens.

1 Claim, 1 Drawing Figure

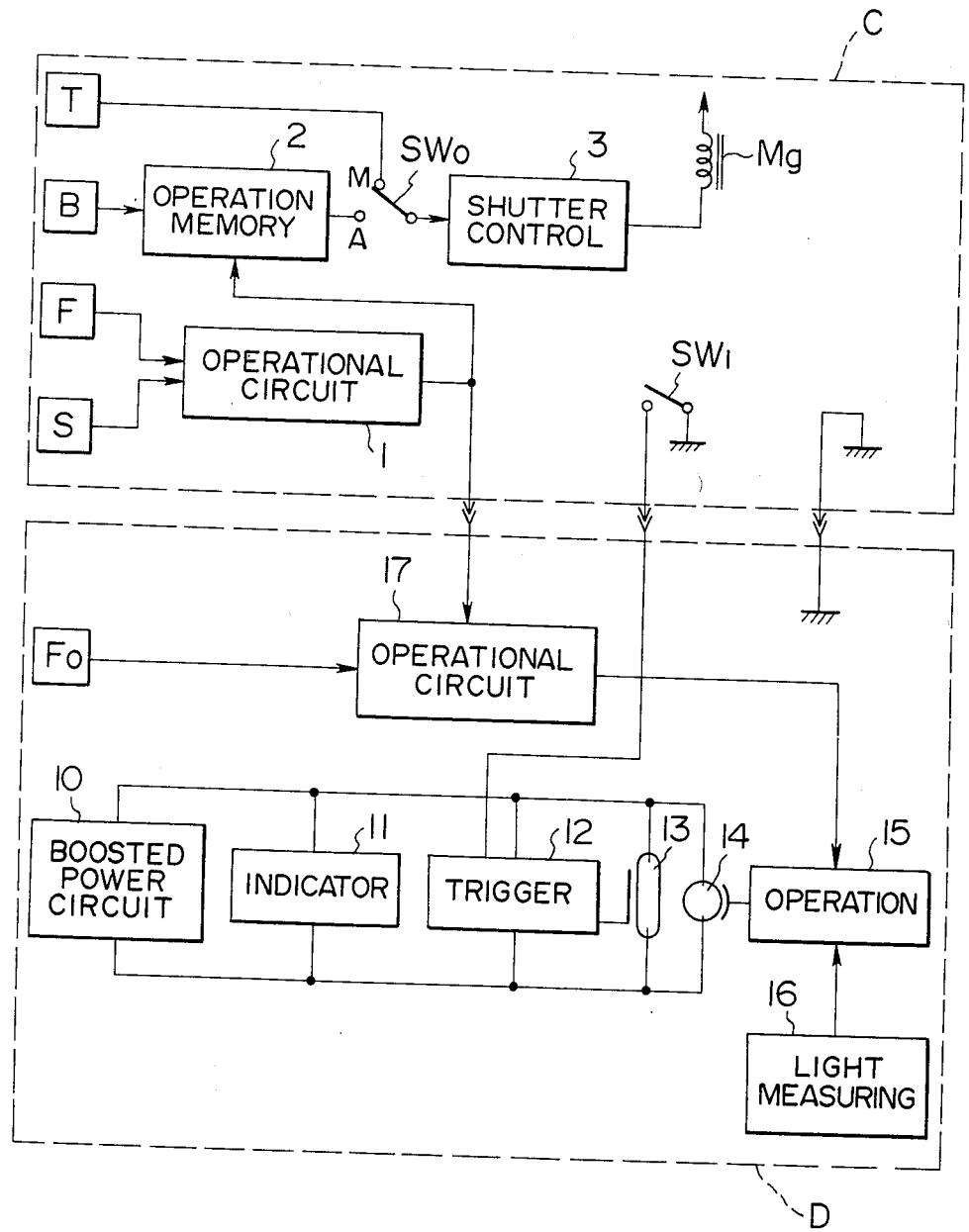

AUTOMATIC FLASH LIGHT CONTROL DEVICE FOR CAMERA

BACKGROUND OF THE INVENTION

1. Field of the Invention

This invention relates to an automatic flash light device for a photographic camera, and more particularly to an automatic flash light control device for a camera having both an automatic flash light device and an interchangeable taking lens.

2. Description of the Prior Art

In conventional single lens reflux cameras having an interchangeable lens and provided with an automatic flash light device, the diaphragm aperture of the taking lens is predetermined according to the film sensitivity of the film in the camera, and the amount of light emitted by the electronic flash light device is controlled to obtain a desirable exposure in combination with the predetermined diaphragm aperture. Therefore, in a camera provided with the conventional automatic flash light device, the size of the diaphragm aperture is automatically determined according to the sensitivity of the film when the flash light is used. This is disadvantageous because it results in the focal depth, which depends upon the aperture size, also being automatically determined, and accordingly, it is impossible with such a camera to freely select the focal depth where pictures are taken under flash light condition.

In order to solve the above mentioned problem, it is possible to introduce information regarding the proper diaphragm aperture into the automatic flash light device together with information regarding the film sensitivity, so that the amount of light emitted by the electronic flash light device is controlled according to both the proper diaphragm aperture size and the film sensitivity of the film in the camera.

However, in a single lens reflex camera with an interchangeable taking lens of diaphragm aperture priority mode, the shutter speed control circuit is provided with a full aperture light measuring means or a stopped down aperture light measuring means. Therefore, the information regarding the diaphragm aperture in this type of camera is represented by a value corresponding to the displacement from the full aperture. Accordingly, when the amount of light emitted by the electronic flash light device in the automatic flash light device is controlled according to the information which normally represents the aperture size in the camera in terms of the displacement of the aperture size from the full aperture, the finally controlled amount of light will change as the full aperture size changes in different taking lenses. In other words, even when the same aperture size is selected in different cameras or lenses, the resulting amount of light emitted by the controlled electronic flash light device will change if the full aperture sizes of the lenses are different from each other.

SUMMARY OF THE INVENTION

In view of the above mentioned defect inherent in the conventional automatic flash light device, it is the primary object of the present invention to provide an automatic flash light control device for a single lens reflex camera having an interchangeable lens and equipped with an automatic flash light device in which the amount of light emitted by the electronic flash light device is always controlled correctly in view of the selected diaphragm aperture size regardless of the full aperture size of the taking lens.

The above object of the present invention is accomplished by incorporating a full aperture size input means into the automatic flash light device together with film sensitivity input means and the selected diaphragm aperture size input means.

BRIEF DESCRIPTION OF THE DRAWING

The single FIGURE is a block diagram of the circuit of the automatic flash light control device in accordance with the present invention shown together with the circuit of an exposure control device in a camera to which the automatic flash light control device is attached.

DESCRIPTION OF THE PREFERRED EMBODIMENT

Now the present invention will be described in detail with reference to a particular embodiment thereof referring to the accompanying drawing. In the drawing, the reference character C indicates the circuitry built in a camera body and D indicates the circuitry built in an automatic flash light control device attached to the camera body.

The circuit in the camera body comprises an operational circuit 1 connected with a film sensitivity input means S to receive an input Sv and a diaphragm aperture size input means F to receive an input $\Delta Av$; which represents the diaphragm aperture size selected in terms of the displacement from the full aperture size, and a shutter speed input means T having an output signal Tv and a scene brightness input means B with an output signal Bv. The output $\Delta Av - Sv$ of the operational circuit 1 is inputted into an operation memory circuit 2 together with the information Bv from the scene brightness input means B. The output $Tv = Sv + Bv - \Delta Av$ of the operation memory circuit 2 is connected with a terminal A of a change-over switch SWo. The change-over switch SWo has another terminal M which is connected with the shutter speed input means T, and is used for changing over between a manual control mode (M) and an automatic control mode (A). The change-over switch SWo is connected with a trailing shutter blind control means 3 that is connected with a trailing shutter blind drive magnet Mg. Since the above mentioned structure is well known in the art of conventional cameras with automatic exposure control means, the detailed description thereof is omitted here.

The circuit in the automatic flash light control device comprises a boosted power circuit 10, an indicator 11 connected therewith for indicating the output voltage thereof, a trigger circuit 12 connected with the output of the power circuit 10 and triggered by an X-contact SW1 in the camera body, a flash light tube 13 energized by the trigger circuit 12, a by-pass tube 14 connected in parallel with the flash light tube 13 having a lower impedance than the flash light tube 13 so as to be energized when the energization of the flash light tube 13 is to be terminated. A operational circuit 15 connected with the by-pass tube 14 for triggering the by-pass tube 14, while a light measuring circuit 16 is connected with the operational circuit 15 for receiving light reflected by the object illuminated by the flash light emitted by the flash light tube 13 and causing the operational circuit 15 to trigger the by-pass tube 14 by the output Lv thereof according to the amount of light measured thereby. There is also a full aperture size information input means Fo, and another operational amplifier 17 connected with the full aperture size information input means Fo to receive an input Avo and said operational amplifier 15 for giving thereto an output representing the output $\Delta Av - Sv$ of said operational amplifier 1 in the camera body modified by the full aperture size information Avo given by the full aperture size information input means Fo.

Now the operation of the above described embodiment of the invention will be described in detail. At first, the change-over switch SWo is changed over into the manual control mode (M) as shown in the drawing, and the shutter speed input means T is set to give a shutter speed proper for flash light photography. This can be done automatically in response to attachment of the flash light device to the camera body or in response to completion of preparation for flash light energization in the flash light device.

Upon attaching the flash light device to the camera body, the selected diaphragm aperture size and the film sensitivity are inputted into the operational circuit 17 in the flash light device by way of the operational circuit 1 in the camera body. Simultaneously therewith, the X-contact of the camera is connected with the trigger 12 by way of a connector between the camera and the flash light device. Further, the full aperture size of the taking lens mounted on the camera is input into the operational circuit 17 by means of the full aperture size information input means Fo. Hence, the operational circuit 15 in the flash light device is provided with an input indicative of a combination of the selected diaphragm aperture, the film sensitivity of the film in the camera, and the full aperture size of the taking lens mounted on the camera.

Then, upon depression of a shutter release button (not shown) of the camera, the shutter is released and the X-contact SW1 is turned on when the shutter is fully opened as well known in the art. In response thereto, the trigger circuit 12 is driven to given a high voltage to energize the flash light tube 13.

The light emitted by the flash light tube 13 is reflected by the object to be photographed and is measured by the light measuring circuit 16. The operational circuit 15 operates to turn on the by-pass tube 14 on the basis of the combination of the output from the light measuring circuit 16 and the output from the operational circuit 17 representing the film sensitivity, the selected aperture size and the full aperture size of the taking lens.

Upon energization of the by-pass tube 14, the flash light tube 13 is turned off to terminate the exposure and thereafter the shutter is closed to complete the exposure.

In accordance with the present invention as described above, the full aperture size information is inputted into the operational circuit in the automatic flash light control device so that the selected diaphragm size information represented by the displacement from the full aperture size is converted to the real diaphragm aperture size. Accordingly, the amount of light emitted by the flash light device is always controlled properly according to the selected diaphragm aperture size.

In the above described embodiment of the invention, the amount of light emitted by the electronic flash light tube is controlled by a by-pass method in which the current flowing through the flash tube is by-passed through a by-pass tube when the energization of the flash light tube is to be terminated. However, it will be understood by those skilled in the art that the control of the amount of light emitted by the electronic flash light tube can be conducted by a series method in which a switch is connected in series between the flash light tube and a capacitor for supplying electric current to the tube to cut off the supply of current to the tube when the energization of the tube is to be terminated.

Furthermore, it will be understood that the full aperture size information input means Fo need not necessarily be provided in the automatic flash light control device but may be provided in the camera body. Further, the full aperture size information input means Fo may be made to be an automatic information input means so that the full aperture size information is automatically input into the operational circuit in response to attachment of the flash light device to the camera or in response to mounting of the interchangeable lens on the camera body.

I claim:

1. In a camera having a camera body, and a flash light device removable from said body, an automatic flash light control device for a single lens reflex camera having an interchangeable lens and provided with an exposure control means of the aperture size priority type in which the amount of light emitted by an electronic flash light tube is controlled by a control means according to the light reflected by an object to be photographed and illuminated by light from the flash light tube in view of the film sensitivity of the film in the camera and the selected diaphragm aperture size of the taking lens of the camera represented in terms of the displacement of the selected diaphragm aperture size from the full aperture size of the taking lens, wherein the improvement comprises: a full aperture size information input means provided in said flash light device and connected with said control means for giving information on the full aperture size of the taking lens to said control means, whereby said control means controls the amount of light emitted by the electronic flash light tube in accordance with the combination of the film sensitivity of the film in the camera, the selected diaphragm aperture size of the taking lens of the camera represented in terms of the displacement thereof from the full aperture size of the taking lens, and the full aperture size of the taking lens.

* * * * *